(12) United States Patent
Massieu (10) Patent No.: US 6,879,428 B2
(45) Date of Patent: Apr. 12, 2005

(54) FRAME GRABBING WITH LASER SCANNER WITH SWEEPING BY SILICON PLANAR ELECTROSTATICS ACTUATOR

(75) Inventor: Jean-Louis Massieu, LaBege (FR)

(73) Assignee: Intermec IP Corp.

( * ) Notice: Subject to any disclaimer, the term of this patent is extended or adjusted under 35 U.S.C. 154(b) by 0 days.

(21) Appl. No.: 10/328,870

(22) Filed: Dec. 24, 2002

(65) Prior Publication Data

US 2003/0174382 A1 Sep. 18, 2003

Related U.S. Application Data

(60) Provisional application No. 60/342,687, filed on Dec. 26, 2002.

(51) Int. Cl.[7] ........................... G02B 26/08; G02B 26/00
(52) U.S. Cl. ...................... 359/290; 359/291; 359/292; 359/223; 359/224
(58) Field of Search ................................. 359/290–292, 359/223–224

(56) References Cited

U.S. PATENT DOCUMENTS 6,201,629 B1 * 3/2001 McClelland et al. ........ 359/223

* cited by examiner

Primary Examiner—Hung Xuan Dang
Assistant Examiner—Joseph Martinez
(74) Attorney, Agent, or Firm—Orum & Roth (57) ABSTRACT

A method of capturing images using a laser scanner equipped with a 2D micro actuator. The 2D micro actuator allows for laser beam location without the use of additional components dedicated to determining beam location. The 2D micro actuator is used to stabilize the positioning function of the spot in the scene. The micro actuator is a 1D micro actuator suspended within a second framework by two torsion bars and two pairs of orthogonal additional electrodes. The image is scanned, a precise rectangle of the character sensing field is generated and the image is created by keeping a substantially constant pitch.

12 Claims, 8 Drawing Sheets

FRAME GRABBING WITH LASER SCANNER WITH SWEEPING BY SILICON PLANAR ELECTROSTATICS ACTUATOR

This application claims that benefit of U.S. Provisional Application No. 60/342,687 filed Dec. 26, 2002.

BACKGROUND OF THE INVENTION

1. Field of the Invention

The invention generally relates to a method and apparatus for image capture. Specifically, the invention relates to directing a laser video beam into parallel lines at a known location for use in a laser scanner.

2. Brief Summary of the Invention

There are two principal technologies used in image capture. The first relies on the use of a photosensitive sensor on which the image of a scene is optically projected. This technology is used for Imagers, Charged Coupled Devices known as CCD, and Active Pixel Sensors known as APS. The second uses a spot of concentrated light which sweeps the scene and whose radiation is sampled, quantified and spatially reordered to form an image. This technology is used for Laser Scanners.

Previous video frame capture was performed optically, for example, in a case of 2D CCD video image. Optical solutions suffer from poor depth of field. Contrarily, laser scanners have increased depth of field, but are incapable of video frame capture. To perform video frame capture with a laser it is necessary to record or device the time sequenced laser beam location. Previously, the laser beam location has been detected via the use of secondary circuits which monitor the reflected beam in a CCD matrix and/or window reflected light 2D CCD schemes. These solutions require additional components dedicated specifically to determining beam location. The present invention provides a solution that does not require additional components, thereby creating materials, manufacturing and energy consumption efficiencies.

The first technology is naturally directed towards frame grabbing, because the photosensitive pixels are spatially ordered and it is simple to extract an isometric image. Laser scanners read images in conjunction with oscillating mirros to automatically move the beam back and forth across the image.

It is more difficult to acquire an image with a sweeping device because guaranteeing with precision the position of the spot in the scene requires cumbersome and expensive hardware. Therefore the sweeping devices have been limited to applications of high added value such as display and 3D acquisition, or for the capture of one-dimensional images such as 1 D bar codes and stacked bar codes.

Laser scanners make it possible to obtain images of great depth, i.e. they can read images from far away, of field by the dissociation of the means of collection of light and spot production. Indeed, the spatial resolution of a laser scanner is related primarily to the size of the spot. The spot can be reduced to the limit of diffraction.

The spatial resolution of CCD devices depends not only on the size of the CCD pixels, but also on their sensitivity which requires a lens and aperture.

The last decade saw an emerging technology, Micro Electro Mechanical Systems (MEMS), which makes it possible to produce low cost deflectors with several degrees of freedom in a very small size, while oscillating at high speed and consuming little power. One can thus imagine a pen type 2D symbol reader with high depth of field, projecting a laser scanning of rectangular form delimiting precisely and with brightness the reading zone. It would be possible to change dynamically the sweep angles (zoom effect), making it possible to reduce the number of samples necessary.

Laser scanners lend themselves well to 3D frame grabbing by modulating the beam amplitude and by detecting the margin of dephasing of the reflected signal, making it possible to produce endoscope 3D.

The principal problem arising for acquiring a specially ordered image is the stability of the positioning function of the spot in the scene. There are several electro-mechanical technologies useful for stabilizing the positioning function. One can classify them into two families. The first family includes devices with high inertia and the second, those with low inertia. The high inertia devices use one or more rotating polygons which, by their accumulated kinetic energy, make it possible to make the angular velocity of the spot constant and insensitive to external disturbances. One can thus reach high speeds by the multiplication of the number of facets of the polygons and the use of synchronous motors or turbines with air cushion. These high inertia systems are cumbersome because of their mass and high energy consumption. Technologies with low inertia include oscillating systems actuated by electrostatic, piezoelectric, or magnetic forces. The weak inertia of these devices makes it possible to maintain them in resonance with little energy. One of their major defects until now were their relatively low (less than for 1000 Hz, angles of oscillation 40°) angular velocities.

A micro actuator MEMS consists of an oscillating assembly made out of a chip of silicon of a few tens of microns thickness and surface area approximately equal to that the spot. The absence of wearing parts (the bearings are replaced by two arms of silicon), and the reduction of the moment of inertia allow high frequencies of oscillation with little input energy. Moreover, the miniaturization of the deflector allows the packaging in a rarefied atmosphere which reduces damping due to air resistance and increases the amplitude of oscillation (less than 30 kHz, for angles of oscillation of 40°).

The present invention is a method of producing parallel, time sequenced laser beam location, intensity ordered pairs. This solves the laser video beam problem with a single component. Prior art methods rely on an external method of beam location such as direct linear CCD detection and window reflected light 2D CCD beam location. Prior art methods require additional components dedicated specifically to beam location. The present invention uses no additional components for beam location, other than the scanning mirror and information derived from the moving mirror.

DETAILED DESCRIPTION OF THE DRAWINGS

DETAILED DESCRIPTION OF THE INVENTION

Figure 1:
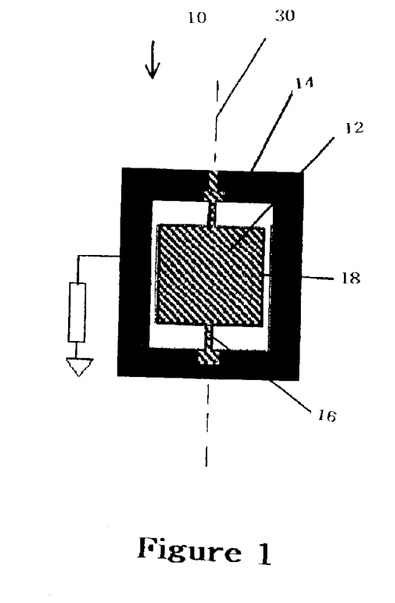
FIG. 1 is a view of a micro actuator.
Figure 2:
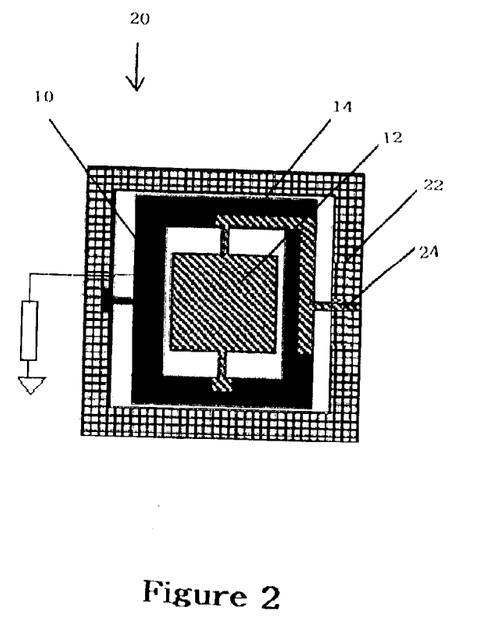
FIG. 2 is a view of a 2D micro actuator.

The 2D micro actuator of the present invention is based on the technology of the micro planar resonant actuator developed in partnership with Fraunhofer Institute of Dresden within the framework of the project Europeen Mirage. A micro actuator 10 includes a mirror 12 suspended within a framework 14 by two torsion arms 16 defining an axis of oscillation 30. The 2D micro actuator 20 of the present invention includes a 1D micro actuator 10 suspended within a second framework 22 by two torsion bars 24 and two pairs of orthogonal additional electrodes. The 2D micro actuator 20 thus obtained is a monolithic part of silicon which can be manufactured according to standard processes used for semi conductors CMOS. Several thousands of micro actuators can be carried out in parallel on same the wafer. The geometry out of comb of the electrodes allows one to obtain angles of oscillation up to $40\mu$ with less than 20 V, for a frequency of oscillation of 140 hertz to 20 kHz. The frame 14 of the micro actuator 10 serves as a ground. The driving voltage of applied to the mirror. In the 2D micro actuatuation 20, the driving voltage is applied to the frame 22.

The oscillation in resonance is maintained by the production of electrostatic attractions between each of the electrodes 18 placed on the two dimensions opposed to the axis of rotation. Compared with other technologies that have electrodes located under the mirror or electromagnets with the associated ferromagnetic elements, this technology offers the following characteristics:

The actuator is a monolithic part of silicon including the electrodes of actuation and thus does not require additional assembly The electrodes do not interfere with the clearance of the mirror.

The electrodes have a capacitance which varies with their spacing (d). The capacitance is maximum at rest and varies as $1/d$, while the electrostatic force varies as $1/d^2$. The measurement of the maximum value of capacity makes it possible to detect dynamically, with a high degree of accuracy, the frequency of oscillation and to maintain it in resonance. This characteristic is fundamental because of the high Q-factor.

The width of the impulse produced by the variation of capacitance is an image of the angular displacement, which makes it possible to control the amplitude of oscillation.

The field of attraction of the electrodes is localized so there is no electrostatic coupling between the X and Y axes.

By applying a continuous tension between the electrodes, it is possible to add an electrostatic restoring moment to the mechanical restoring moment of the torsion bars, which can modify the Eigen frequency. Thus, it is possible to synchronize the two resonant oscillations, which is essential to obtaining a predictable sweeping raster. The micro actuator consists of two independent orthogonal oscillators.

The micro actuator 10, 20 is fabricated out of silicon. The central part 12 is covered with a reflective aluminum deposit forming the mirror 12. The mirror 12 and the frame 12 are electrically insulated.

The description below relates to the oscillation of the central part 12 compared to the first frame 14. The second oscillation of the first frame 14 compared to the second frame 22 functions on the same principle.

Figure 3:
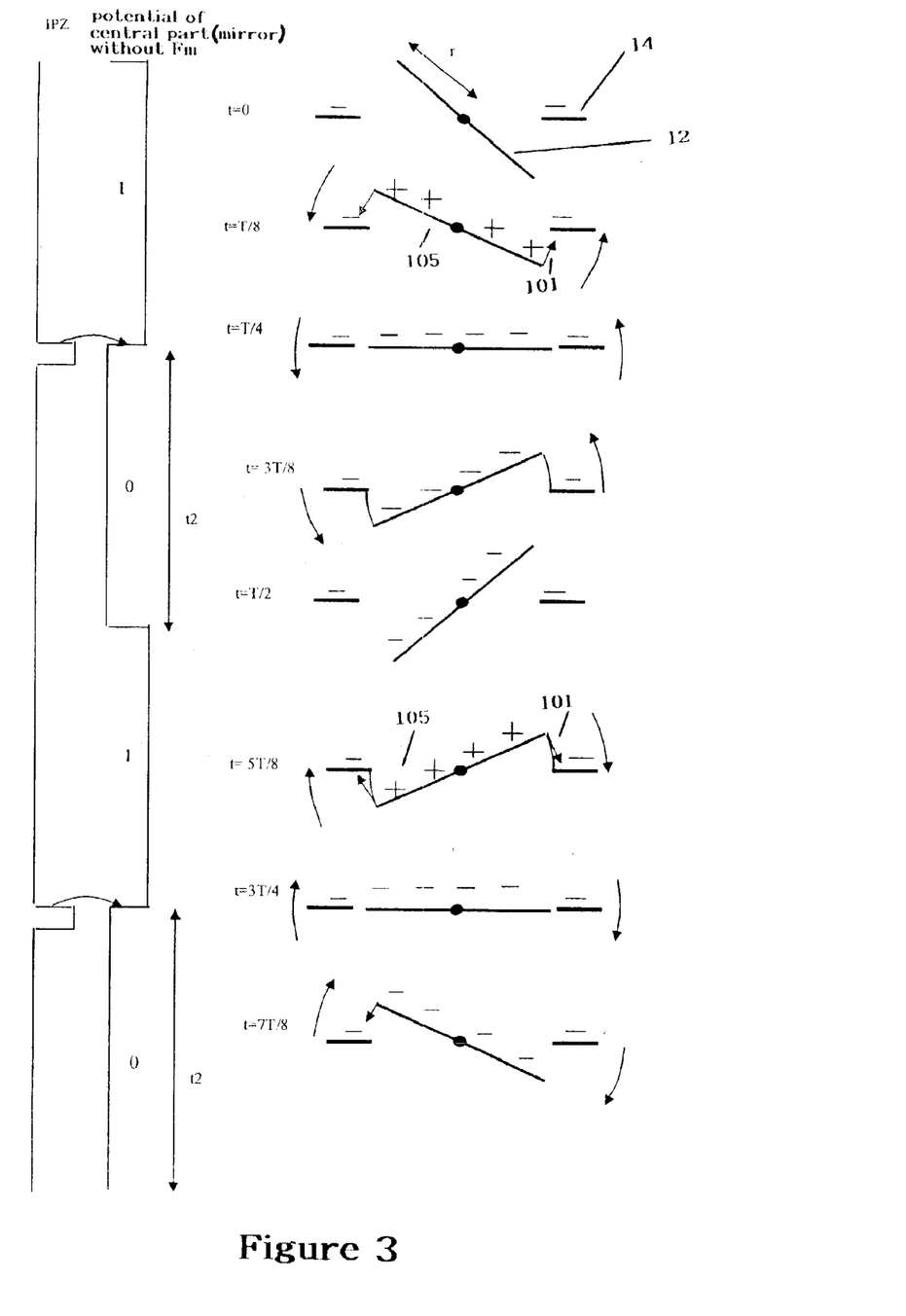
FIG. 3 is graphic representation of the oscillation of the mirror.

The edges of the parallel mirrors 12 form two pairs of electrodes 18 cut out in the shape of comb for better effectiveness. Referring to FIG. 3, the device is maintained in resonant oscillation by applying a potential difference between the mirror 12 and the frame 14 when the mirror 12 returns to its position of balance. This coupling maintains the oscillation.

When the oscillation starts, excess energy is quickly dissipated and the amplitude of oscillation settles until there is balance between the energy transmitted to the mirror and dissipated energy. In operation, additional energy is only needed to compensate for the damping of oscillation with the air and the losses by induction or leakage current, which are negligible. Power consumption is very low.

The maximum acceptable tension limits the angular amplitude of oscillation. The structure of the electrode combs makes it possible to increase the surface area and thus their effectiveness.

The system is very efficient and has a high Q-factor. The Q-factor for the system is in the range of 50 to 100. The Eigen frequency can vary within manufacturing batches. To offset production variation, the frequency of each actuator can be maintained at a perfectly constant sweeping amplitude by applying an open loop excitation frequency.

The oscillation of the mirror is detected by the measurement of the variation of inter-electrode capacitance. This variation is detected and formatted in an E impulse by crossing the electrodes, which maintains a mode-locked frequency.

The capacitance variation is detected by adding to the control signal, FC, an alternating voltage, FP, where FP is greater FC, in addition to the mirror energy. The resistance connecting the frame to the mass is attenuated by a network. The amplitude of this signal is demodulated by a synchronous demodulator, then filtered and formatted as an impulse representing the moment the mirror passes by the frame called the Impulse of Passage to Zero (IPZ).

IPZ has a frequency equal to the frequency of oscillation. Detecting and using the IPZ allows locking into the resonance frequency. The amplitude of oscillation is proportional to the speed of crossing of the electrodes, $v=A\cdot\omega\cdot r$, and thus to the width of IPZ. The control of the IPZ amplitude thus makes it possible to detect the maximum amplitude of oscillation. For a typical resonant frequency, Fr=1/T, the frequency of excitation is FC=2Fv+Fp, where FP is the carrier frequency and FP is greater than Fr. In the sustaining mode, the vertical frequency, Fv=Fr=frequency of resonance of the mirror.

Figure 4:
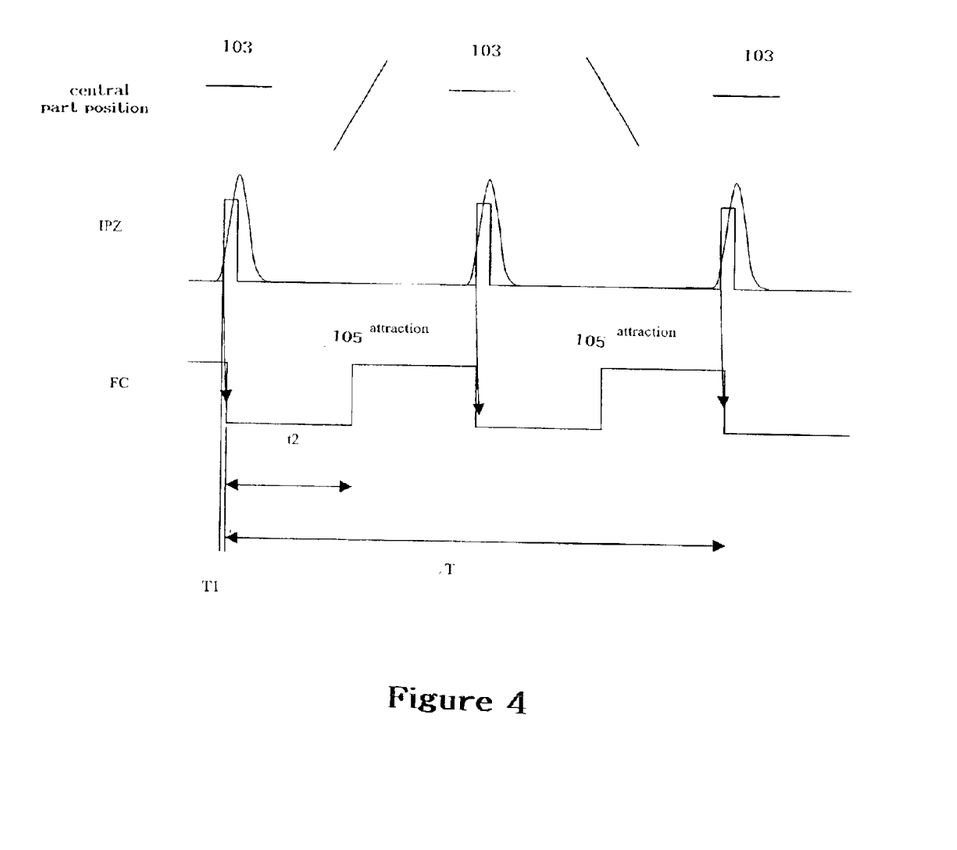
FIG. 4 is a graphic represenation of the positon of the mirror, the impulse, and the control signal.

When starting the oscillation, one varies Fv from an initial value Fi where Fi is greater than Fr, while decreasing by steps dF=Fr/Q, where Q is the Q-factor. When the Fv frequency approaches the resonant frequency of the mirror, small mirror oscillations appear because of the high Q of the system and the inherent misalignments of the electrodes which are sufficient to produce a torque in spite of the orientation of the attraction forces in the plane of the mirror. By taking advantage of IPZ impulses, the mirror oscillations are maintained in a synchronous way as follows:

Referring to FIG. 4, impulse IPZ starts with an impulse of duration t2 initially set at ¼ Fr. At the end of time t2, the mirror starts its return towards its zero position 103 and a potential is applied between the electrodes. An electrostatic force 105 is then added such that because of the attraction 101 between the mirror and the frame, the torsion arms brings the mirror back towards its zero position 103. It is important to note that the force is negligible because of the spacing of the electrodes. Therefore, the precision of time t2 is not critical. The crossing of the electrodes to the zero position generates an impulse IPZ which returns the potential of the mirror and the electrostatic force to zero, and starts again the meter t2. Therefore, the system is fixed on the Eigen frequency of the device.

After the start, the amplitude of oscillation aligns with the width of the IPZ impulse decrease until the system reaches a permanent mode where the energy transmitted to the mirror balances the mechanical energy dissipated.

The amplitude of oscillation in the established mode is maximized if the restoring potential of the mirror coincides very precisely with the passage to zero of the mirror. If the restoring force is early, the force of attraction disappears before the mirror completes its return. If it is late, the force of attraction slows the mirror as it moves away. In both cases, the amplitude of oscillation reached is not the maximum. The maximum amplitude is reached by synchronizing the extinction of the recall force with the crossing of the electrodes. For that, a progressive delay is applied between the impulse IPZ and the release of t2. The width of the impulse IPZ is the same as the amplitude of oscillation.

Once adjusted, it is possible to regulate the sweeping amplitude by modifying time t2. The principle of Lissajous sweeping is well known and consists of two oscillations applied to the x and y axes.

$$y(t)=\cos(2\cdot\pi\cdot fv\cdot t)$$

$$x(t)=\sin(2\cdot\pi\cdot fh\cdot t+\phi)$$

and k=frequency ratio=fh/fv

Referring to FIGS. 5A–6B, if the two frequencies are unequal, one obtains a family of patterns commonly called a raster. If k is whole, one obtains a sweeping of 2*k lines. If k is a rational number, (which can be written in the form of a relationship between two whole numbers), then one obtains a stationary interlaced sweeping 30. If k is irrational, sweeping is not stationary and seems to slip vertically. What interests us is the case of k rational, because the raster figure obtained makes it possible to multiply the vertical space resolution.

Figure 5A:
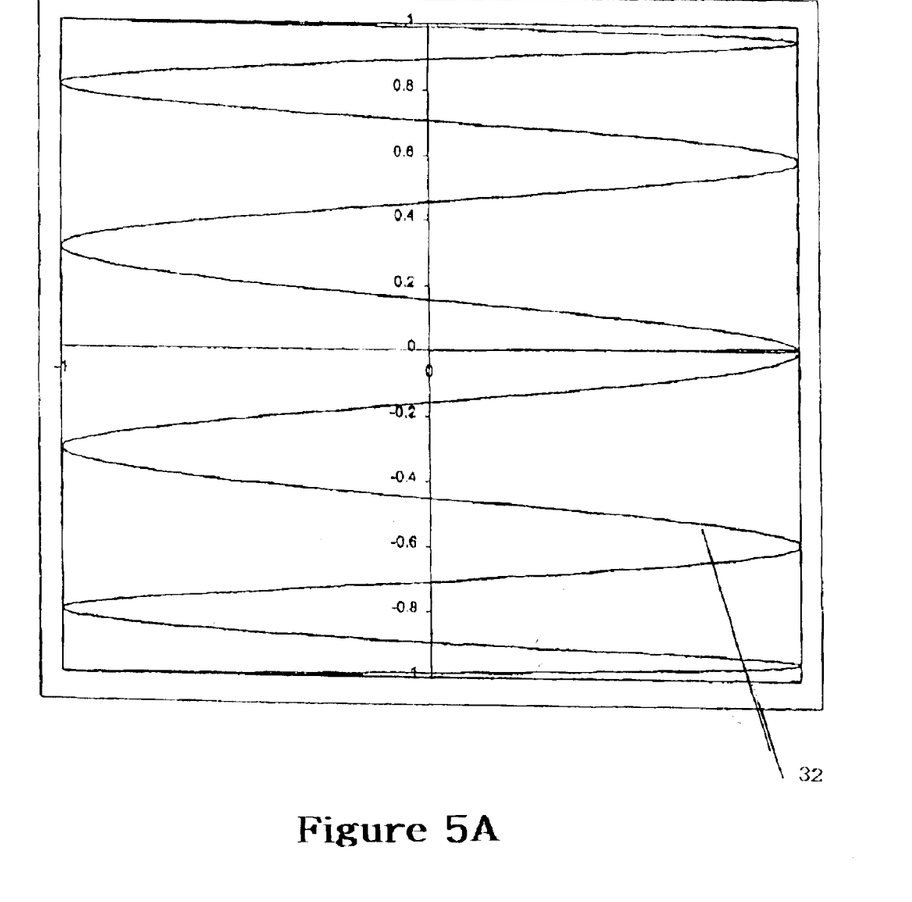
FIG. 5A is a view of sweeping lines.
Figure 5B:
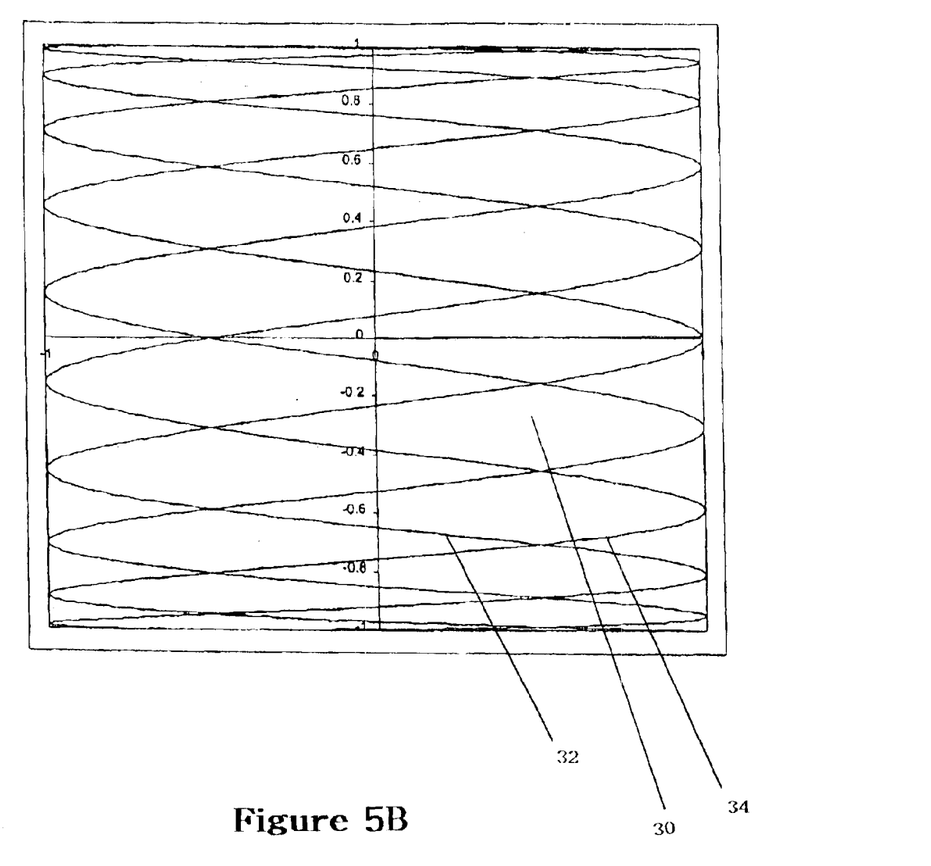
FIG. 5B is a view of raster sweeping lines.
Figure 5C:
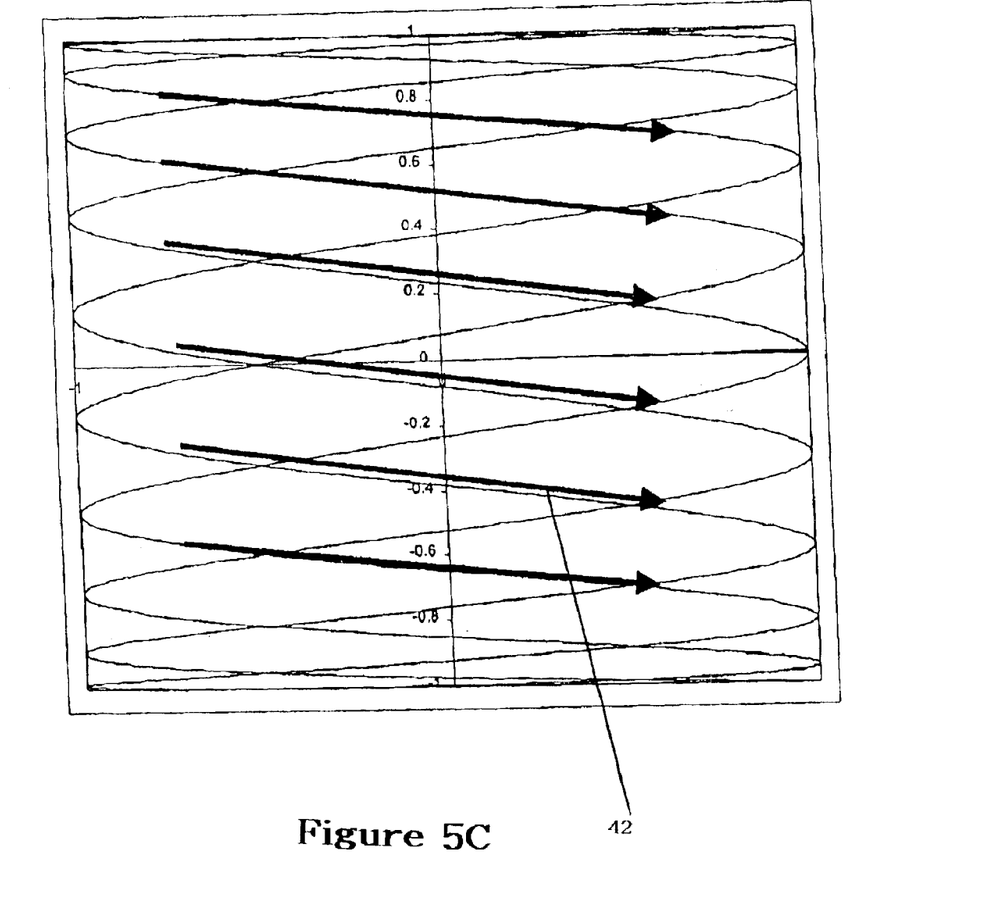
FIG. 5C us a schmatic of the retained lines of the image.

For stationary interlaced sweeping k=ratio of horizontal frequency to vertical frequency=fh/fv. Further, the frequency ratio k=AN, an irreducible fraction with A and NR together. Sweeping comprises two distinct lines 32, 34 grouped in cycles N/fv. NR corresponds to the depth of interlacing Tv=vertical period
Th=horizontal period
Th=Tv/k
K=(K Tv MOD Th)
R=TV MOD Th
$\phi=((2\cdot Pi)/N)\cdot(Nmod\ 2+1)$
Frequency image=fv/N For the horizontal deviation in x, a simple inverse sine law of sampling makes it possible to obtain a constant horizontal pitch. sin(w·t) tan(w·t) Only the side parts of the spot pattern are immobilized and will be truncated.

It is impossible to make this same correction for the vertical pitch. A known solution is to linearly control the vertical deviation using a forced oscillation y=at. One of the disadvantages of this method is that the electrostatic forces are just sufficient to maintain a resonant oscillation. Therefore, the vertical movement often requires a magnetic force requiring the addition of a ferro-magnetic element. The present solution uses a resonant oscillation for the vertical movement. The higher and lower lines of the variation of pitch are isolated. By using Rv=scene/swept scene=0.5, a varying standardized pitch of 0.86 with respect to the standardized pitch in the center of the scene is obtained. Moreover, only the lines of the same slope signs are retained.

The report of the minimal pitch to the maximum pitch according to the position of the spot in the figure is $pitchX_{min}/pitchX_{max}=1/\sqrt{1-x^2}$ and $pitchY_{min}/pitchY_{max}=1/\sqrt{1-y^2}$ where X and y are counted from the center of the scene and <1.

As mentioned previously, it is possible to measure the period of oscillation precisely. The field frequency is controlled relative to the frequency of horizontal oscillation. The time between two horizontal impulses IPZ is measured continuously. According to the desired factor determined by the number of lines and the depth of interlacing, one deduces the frequency from resonance and the phase of the vertical oscillation.

K=a number of lines/depth of sweeping.
$\phi=(\pi/2N)\cdot(Nmod(2)+1)$ or if N even, then $\phi=\pi/2N$ if not $\phi=0$ A phase delay on X is applied by an initial delay of t=0 programmable between the two frequencies. The phase is null if NR is odd.

The control of the vertical frequency is carried out by comparing the $2A^{th}$ delay of the horizontal impulse IPZ with the IPZ vertical impulse. This dephasing must be null if N=0, and is odd or equal to 2pi/N, if NR is even. According to the error, one of the two frequencies of resonance is modified.

One way to modify the frequency in a controlled fashion would be to utilize forced oscillation. However, the very high Q-factor, 50 to 100, prevents the oscillation from achieving the necessary amplitude. The preferred method is to modify the value of the frequency of resonance. Methods were previously proposed to this end by modifying the position of the oscillating masses with the help of additional electrodes in order to modify the moment of inertia and, thus, the frequency of resonance, or by modifying the stiffness of the torsion beams by affecting the saturation using porous materials.

The method of the present invention utilizes a continuously variable electrode signal. From the planar geometry of the micro actuator, this continuous component exerts an additional restoring moment to that of the torsion bars. This is equivalent to modifying the stiffness of the spring and consequently the Eigen frequency, and consequently the frequency of oscillation such that the system is fixed on the Eigen frequency of the device. This method makes it possible to keep the oscillation in resonance and allows the trajectory of the spot to be as close as possible to sine function. The continuous potential can be added to the system.

Another solution is to divide each of the reading electrodes, i.e., the electrodes of the framework on both sides of the mirror into two parts, one being used for starting and synchronous maintenance the oscillations, and the other dedicated to modifying the Eigen frequency of the device.

The amplitude of the tension of the system can be related to the width of the impulse IPZ, in order to regulate and optimize the sweeping coverage according to the X-dimension of the symbol or the image to be read. This improvement allows a zoom effect. Zoom by increase in the amplitudes of oscillation. The zoom effect is useful since the sweeping value is voluntarily reduced to the central part of the scene to keep a constant value of pitch, which consequently reduces the number of available lines.

Figure 6A:
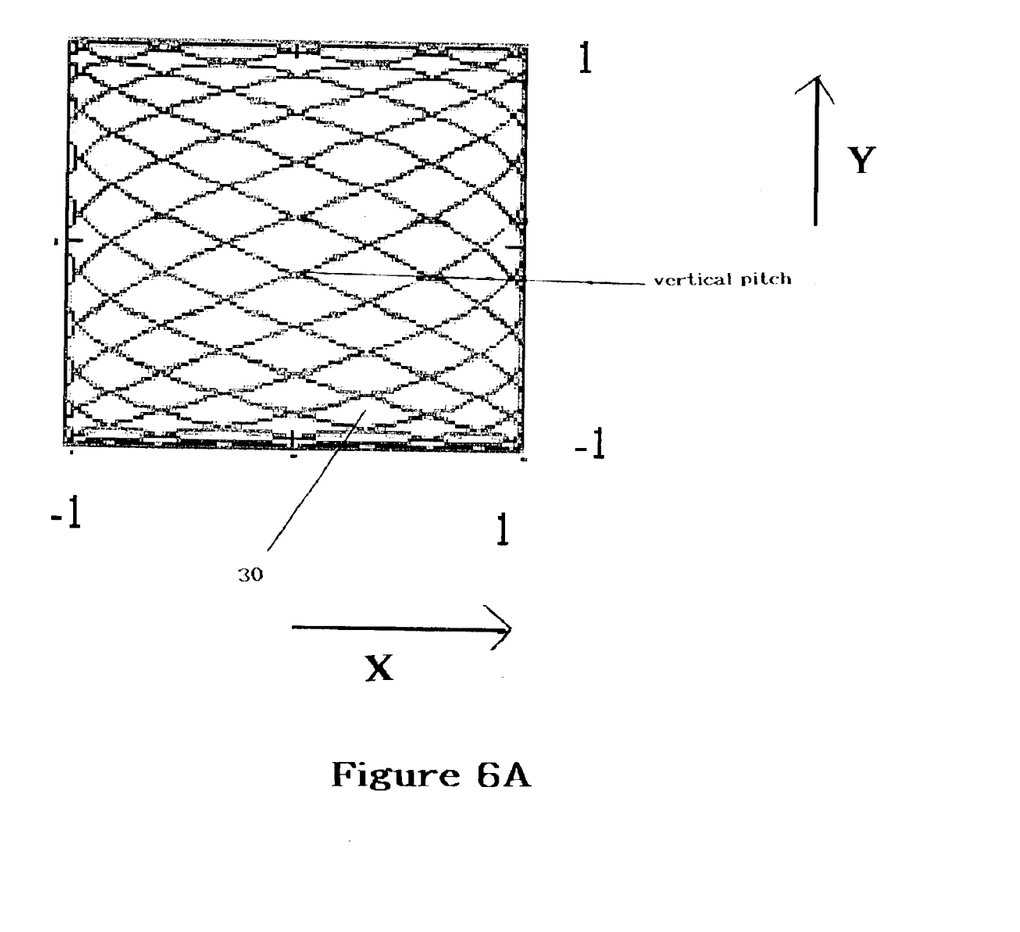
FIG. 6A is a view of raster sweeping lines.
Figure 6B:
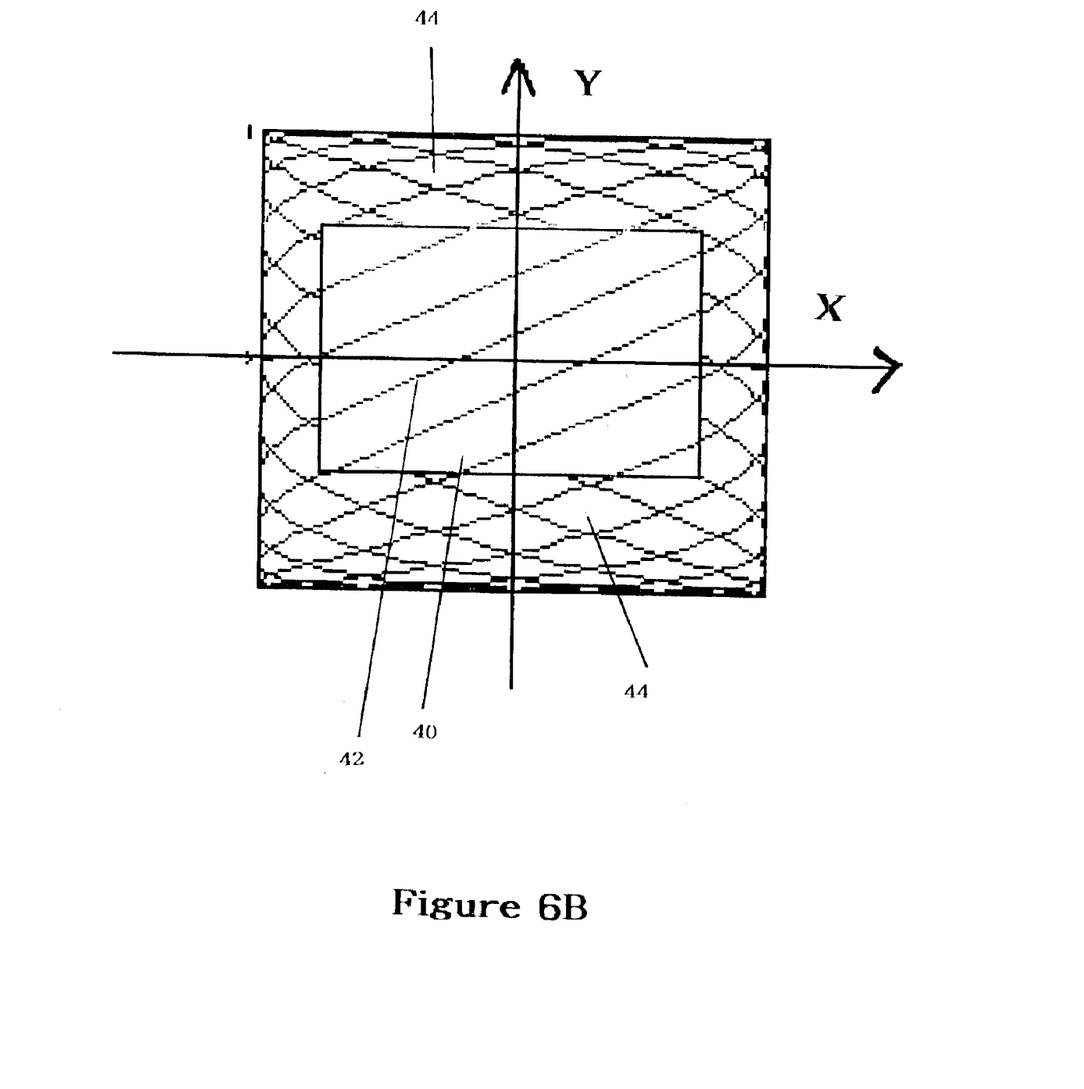
FIG. 6B is a view of a truncated image in a character sensing field.

The laser diode or the source of light being used for the production of the spot is extinct for all the positions of unutilized sweeping in order to generate a precise rectangle of the character sensing field 40. The spot reflected by the scene is digitalized and binary words are arranged in a XY memory representing the image. To keep the most constant possible pitch, only lines 42 of equal slope and sign are retained. Moreover, the high and low part of the image 44 is truncated to keep a constant pitch.

These words can be arranged without a memory where the X address is simply extracted starting from the IPZ and the Y address is An=round(Tv MOD Th) where N is the Nth horizontal period and Tv and Th are the horizontal and vertical period respectively.

Example for a of screen for an image of 116×116 points
Width=201
NR=10
Fv=150 Hz
Fh=3015 Hz
Frame/s=15
Nb effective lines=134

Variation of the central pitch compared to signal and bottom pitches =15.47%
Truncation=0.5
Central pitch variation compared to signal and bottom pitches=15%
Coverage for pitch=0.1 mm: 13 mm×13 mm
Zoom by increases in the amplitude of oscillation. A character sensing field is generated.
The spot reflected by the sun is digitized and binary words are arranged in a x-y memory representing the image.

The invention makes use of information provided by the direct silicon mirror movement in the MEMS configuration. By directly powering the mirror movement by electrostatic control, the precise time of the mirror motion is known, and hence the location of the beam. Placing the mirror in a 2 dimensional lissajous pattern and extracting only the alternating parallel beam reflections allows a video pattern that is similar to the electron beam produced in a television.

Mapping the beam reflectance to the location information allows a video frame to be captured after a series of parallel lines has been assembled. The resultant series of parallel can be analyzed in the same fashion as a 2D CCD video image thereby allowing the decoding of Matrix symbologies such as Datamatrix as well as all 1D and stacked symbologies by with the depth-of-field of a standard laser scanner.

What is claimed is:

1. A method of operating a 2D micro actuator comprising the steps of:
    obtaining a 2D micro actuator;
    oscillating a central part of said micro actuator relative to a first frame, wherein said central part is a mirror;
    maintaining the oscillations in resonance;
    applying a potential difference between the central part and the first frame when the central part returns to its position of balance; and oscillating the first frame relative to a second frame, wherein said 2D micro actuator is subject to an impulse of duration of t2 and said oscillations are maintained by;
    applying the potential at the end of duration t2; and
    adding an electrostatic force such that torsion arms bring the central part back towards a zero position.

2. The method of claim 1 including the additional steps of adjusting the amplitude of the oscillations;
    wherein said amplitude is adjusted by synchronizing extinction of a recall force with the central part crossing the electrodes by applying a progressive delay between impulse and release of t2; regulating a sweeping amplitude;
    wherein said sweeping amplitude is regulated by modifying duration t2; and synchronizing the passage of the mirror to zero with a resorting force.

3. The method of claim 2 wherein the ratio of a horizontal frequency to a vertical frequency is a rational number.

4. The method of claim 2 comprising the additional steps of adjusting the horizontal pitch and vertical pitch to obtain a constant horizontal and vertical pitch, wherein
    said horizontal pitch is adjusted by immobilizing and truncating the side parts of a spot pattern; and
    said vertical pitch is adjusted by isolating the higher and lower lines of the variation in pitch, obtaining a varying standardized pitch, and retaining only the lines with the same slope.

5. The method of claim 4, comprising the additional steps of controlling the horizontal and vertical frequency, wherein one of the two frequencies of resonance is modified.

6. The method of claim 5, wherein
    a continuously variable electrode signal is used to exert an additional restoring moment to torsion bars of the micro actuator and a continuous potential is applied.

7. The method of claim 5 comprising the additional steps of dividing each reading electrode into two parts and using one for starting and synchronous maintenance of the oscillations and using the other to modify an Eigen frequency of the actuator.

8. A method of operating a 2D micro actuator comprising the steps of:
    obtaining a 2D micro actuator;
    oscillating a central part of said micro actuator relative to a first frame, wherein said central part is a mirror;
    maintaining the oscillations in resonance;
    applying a potential difference between the central part and the first frame when the central part returns to its position of balance; and oscillating the first frame relative to a second frame,
    tuning the amplitude of oscillation, wherein said tuning of the amplitude regulates and optimizes sweeping coverage of an image.

9. The method of claim 8 wherein tuning the amplitude provides a zoom effect.

10. A method of operating a 2D micro actuator comprising the additional steps of;
    obtaining a 2D micro actuator;
    oscillating a central part of said micro actuator relative to a first frame, wherein said central part is a mirror;
    maintaining the oscillations in resonance;
    applying a potential difference between the central part and the first frame when the central part returns to its position of balance; and oscillating the first frame relative to a second frame,
    adding an electrostatic force such that torsion arms bring the central part back towards a zero position;
    adjusting the amplitude of the oscillations;
    regulating a sweeping amplitude;
    adjusting the horizontal and vertical pitch;
    controlling the horizontal and vertical frequencies; and
    tuning the amplitude of oscillation.

11. The method of claim 10, wherein
    oscillating the first frame relative to the second frame comprises the steps of:
    oscillating the first frame relative to the second frame;
    maintaining the oscillations in resonance; and
    applying a potential difference between the first frame and the second frame when the first frame returns to its position of balance.

12. The method of claim 11, wherein oscillating the first frame relative to the second frame comprises the additional steps of:
    adding an electrostatic force such that torsion arms bring the first frame back towards a zero position;
    adjusting the amplitude of the oscillations;
    regulating a sweeping amplitude;
    adjusting the horizontal and vertical pitch;
    controlling the horizontal and vertical frequencies; and
    tuning the amplitude of oscillation.

* * * * *